United States Patent
Anderson et al.

(10) Patent No.: US 7,326,884 B1
(45) Date of Patent: Feb. 5, 2008

(54) BUTTER CUP

(76) Inventors: William Arthur Anderson, 6451 Copperwood Ave., Inglewood, CA (US) 90302; Mary-Lynn Anderson, 6451 Copperwood Ave., Inglewood, CA (US) 90302

( * ) Notice: Subject to any disclaimer, the term of this patent is extended or adjusted under 35 U.S.C. 154(b) by 387 days.

(21) Appl. No.: 10/870,652

(22) Filed: Jun. 18, 2004

(51) Int. Cl.
*B05B 7/16* (2006.01)
*B05B 9/01* (2006.01)
*B05B 9/03* (2006.01)
*F27D 11/02* (2006.01)

(52) U.S. Cl. .............. 219/433; 219/386; 219/432; 222/146.5; 222/402.15; 239/375

(58) Field of Classification Search ............ 222/402.13
See application file for complete search history.

(56) References Cited

U.S. PATENT DOCUMENTS

| | | | |
|---|---|---|---|
| 2,756,905 A * | 7/1956 | Wickesberg | 222/146.5 |
| 3,308,269 A * | 3/1967 | Stocker | 219/436 |
| 3,514,579 A * | 5/1970 | Sanders | 219/430 |
| 3,904,086 A * | 9/1975 | Losenno | 222/146.5 |
| 4,463,664 A * | 8/1984 | Peace | 219/433 |
| 4,477,023 A | 10/1984 | Gates | |
| 5,065,927 A | 11/1991 | Wahl et al. | |
| 5,611,206 A | 3/1997 | Sargent | |
| 5,786,573 A * | 7/1998 | Fabrikant et al. | 219/535 |
| 5,955,114 A | 9/1999 | Llanos | |

* cited by examiner

Primary Examiner—J. Pelham

(57) ABSTRACT

A butter heating and dispensing system for facilitating dispersal of melted butter. The system includes a container assembly, a spray assembly, and a heating assembly. The container assembly includes an interior space for receiving a quantity of butter to be melted and dispensed. The spray assembly is operationally coupleable to the container assembly. The spray assembly includes an intake for liquid butter, and a spray nozzle for dispersing the liquid butter. The heating assembly is for providing thermal energy to melt the butter received by the container assembly. The heating assembly is thermally coupleable with the container assembly. Most preferably, the container assembly has a sloped bottom wall, which slopes downwardly towards the intake of the spray assembly.

10 Claims, 2 Drawing Sheets

BUTTER CUP

I. BACKGROUND OF THE INVENTION

The present invention relates to butter applicators and more particularly pertains to a new butter heating and dispensing system for facilitating distribution of melted butter.

II. DESCRIPTION OF THE PRIOR ART

The use of butter applicators is known in the prior art. Illustrative examples include: U.S. Pat. No. 4,477,023; U.S. Pat. No. 5,065,927; U.S. Pat. No. 5,611,206; and U.S. Pat. No. 5,955,114.

While these devices fulfill their respective, particular objectives and requirements, the need remains for a system which allows a user to control a quantity of butter dispersed as well as the area in which the butter is dispersed with a one handed operation.

III. SUMMARY OF THE INVENTION

Perhaps one of the most popular uses for butter is to pour its sweet creamy goodness over a towering mound of fluffy popcorn. As many popcorn lovers would attest, butter is the essential ingredient that brings out the best flavor of this versatile and nutritious snack. While pre-buttered, microwaveable popcorn is widely used, more health-conscious consumers choose to air-pop their own corn. To accent it, these snackers also prefer to melt pure, real butter in a saucepan. While this method of popcorn preparation is more healthy and results in a better tasting treat, heating the butter in such a manner can present challenges. Particularly, it is difficult, if not impossible, to evenly distribute melted butter from a saucepan so that it sufficiently coats every kernel of corn. Instead of clinging to the popcorn, most of the hot liquid tends to run down and settle into the bottom of the bowl. In addition, stovetop butter melting can be a messy endeavor, as errant pouring can result in a greasy range and grimy countertops. Moreover, pouring hot melted butter from a saucepan puts the user at risk for painful burns, as the liquid could easily splatter onto the hands and arms.

The present invention provides a more efficient means of adorning popcorn, as well as any other food item, with melted butter. Simply stated, the present invention is a spray container with heating element that is specially designed to facilitate the application of hot liquid butter to foods. Featuring the shape and design of a small coffee cup, the container would be fabricated of a durable plastic or ceramic material and measure approximately three and three quarters inches (3¾") in height, two and three quarters inches (2¾") depth, and nine point forty-two inches (9.42") in total circumference. The interior of the container assembly or "cup" would feature a thin coating of thermal lining that would serve to keep its heated contents warm. In addition, the bottom interior of the cup would be sloped at an angle of approximately twenty degrees (20°) to ensure that all liquid would be dispensed from the container. Serving as the top of the cup, the specially configured pumping apparatus would be generally circular in shape and feature a recessed, threaded bottom lip to snugly fit into the cup when applied. For additional security, two swivel mounted wire clips could be positioned on the outer rim of the lid to lock it into place. Other components of the pump would include a thumb operated plunger that is integrally connected to a small, elongated hollow tube extending from the bottom of the lid.

In operation, the invention would distribute melted butter through a circular, perforated nozzle measuring approximately one half inch (½") in diameter. The nozzle and pump apparatus are designed to emit a spray that is three inches (3") in diameter and that would reach a minimum of seven inches (7") from the nozzle. The heating assembly would also be comprised of a plastic or ceramic material and rendered in the shape of an "L". The bottom interior of this component would contain the necessary electrical heating source for the externally positioned warming surface. Featured on the upright portion of the "L", three heat transfer points would be connected to a small, red, light emitting diode (LED), visibly positioned on the side panel of the heating element. When the cup is warming, the transfer points connect to the cup's thermal lining, activating the LED when the liquid has finished heating. Electrically powered, the invention's heating assembly would feature a corded plug that could be inserted into any AC outlet.

Use of the invention would be very simple and straightforward. First, the user would fill the cup with butter, whether it is a portion of a stick or scooped from a whipped variety. Placing the lid on the container so that the hollow tube is positioned at the lowest point of the cup, the user could fold down the wire locks to secure the lid in place. After plugging in the heating element, the cup would be placed onto the heater's surface, where the buttery contents will warm and melt until the LED indicates that the cool solid has been converted into a heated liquid. Gripping the cup by the handle, the user would then depress the thumb operated plunger to spray the delectable butter over every single kernel of popped corn. Similarly, the invention can be used to completely adorn other food items such as baked potatoes, warm biscuits, corn on the cob, or any other desired entrée. In addition, the user could spray butter from the invention onto baking pans and skillets. After used, the cup itself could be easily cleaned in a dishwasher or with soap and water, and the heating assembly safely wiped down with a damp cloth.

There are several significant benefits and advantages associated with this unique product invention. Foremost, the invention would provide butter connoisseurs with an easy, safe, and mess-free means of evenly distributing their favorite condiment over virtually any food item. Featuring a cleverly designed spraying mechanism, this practical product would easily coat meats, breads, potatoes, and popcorn with the sweet and delicious taste of butter. Eliminating the need to heat butter in a saucepan, the invention could render a solid butter stick into a warm, savory liquid in a matter of minutes. In this manner, users can avoid the messy cleanups commonly associated with saucepan butter melting while also eliminating the risk of painful burns. While the invention was primarily conceived with butter in mind, other accenting oils, such as the popular and delectable olive oil, could be conveniently heated and sprayed with this product.

To this end, the present invention generally comprises a container assembly, a spray assembly, and a heating assembly. The container assembly includes an interior space for receiving a quantity of butter to be melted and dispensed. The spray assembly is operationally coupleable to the container assembly. The spray assembly includes an intake for liquid butter, and a spray nozzle for dispersing the liquid butter. The heating assembly is for providing thermal energy to melt the butter received by the container assembly. The heating assembly is thermally coupleable with the container assembly. Most preferably, the container assembly has a sloped bottom wall, which slopes downwardly towards the intake of the spray assembly.

There has thus been outlined, rather broadly, the more important features of a butter heating and dispensing system in order that the detailed description thereof that follows may be better understood, and in order that the present contribution to the art may be better appreciated. There are additional features of the butter heating and dispensing system that will be described hereinafter and which will form the subject matter of the claims appended hereto.

In this respect, before explaining at least one embodiment of the butter heating and dispensing system in detail, it is to be understood that the butter heating and dispensing system is not limited in its application to the details of construction and to the arrangements of the components set forth in the following description or illustrated in the drawings. The butter heating and dispensing system is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present butter heating and dispensing system. It is important, therefore, that the claims be regarded as including such equivalent constructions insofar as they do not depart from the spirit and scope of the present invention.

It is another object of the present invention to provide a butter heating and dispensing system which has all of the advantages of the prior art and none of the disadvantages.

It is another object of the present invention to provide a butter heating and dispensing system which may be easily and efficiently manufactured and marketed.

It is another object of the present invention to provide a butter heating and dispensing system which is of durable and reliable construction.

It is yet another object of the present invention to provide a butter heating and dispensing system which is economically affordable and available for relevant market segment of the purchasing public.

Other objects, features and advantages of the present invention will become more readily apparent from the following detailed description of the preferred embodiment when considered with the attached drawings and appended claims.

IV. BRIEF DESCRIPTION OF THE DRAWINGS

V. DESCRIPTION OF THE PREFERRED EMBODIMENT

Figure 1:
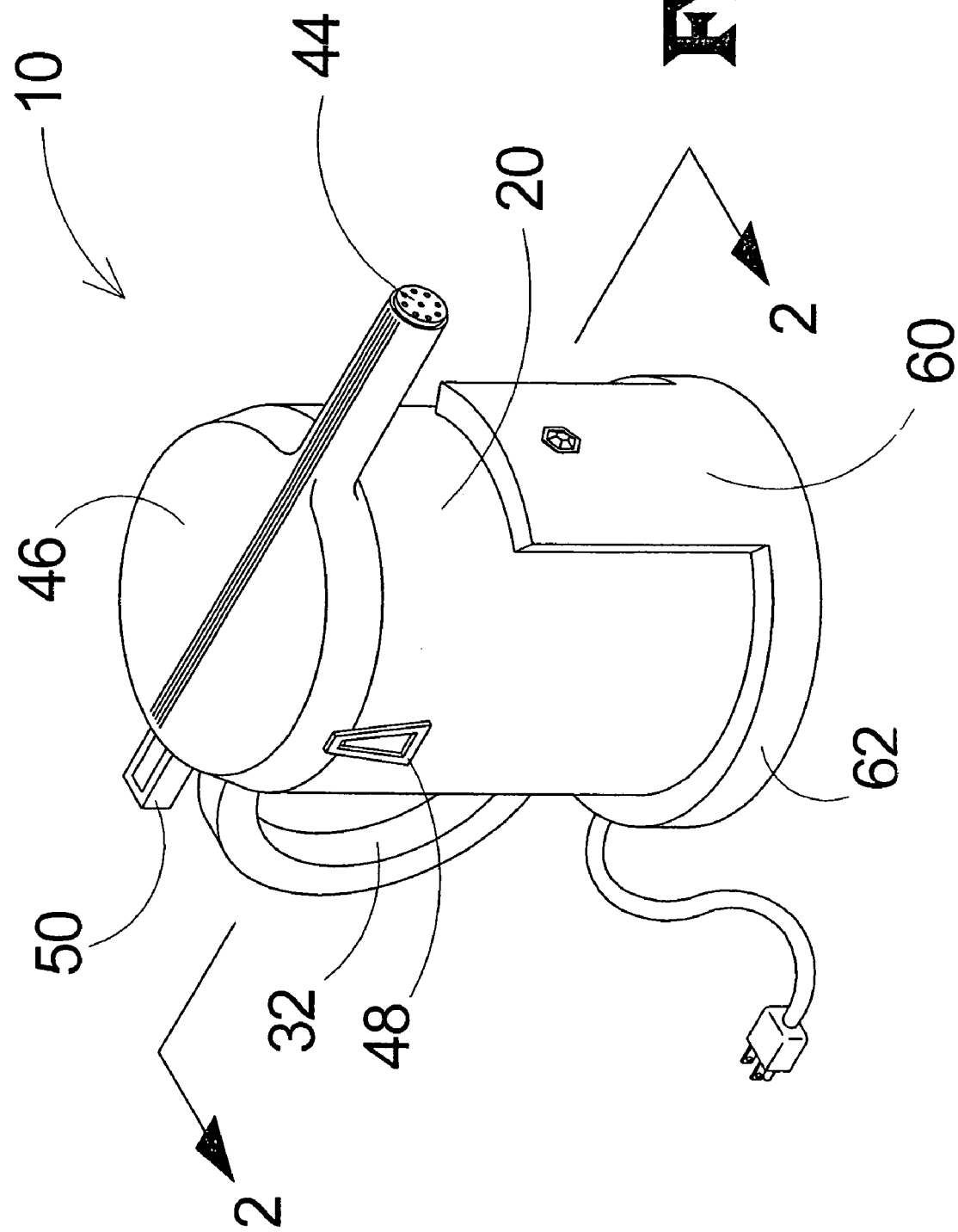
FIG. 1 is a schematic perspective view of a new butter heating and dispensing system according to the present invention.
Figure 2:
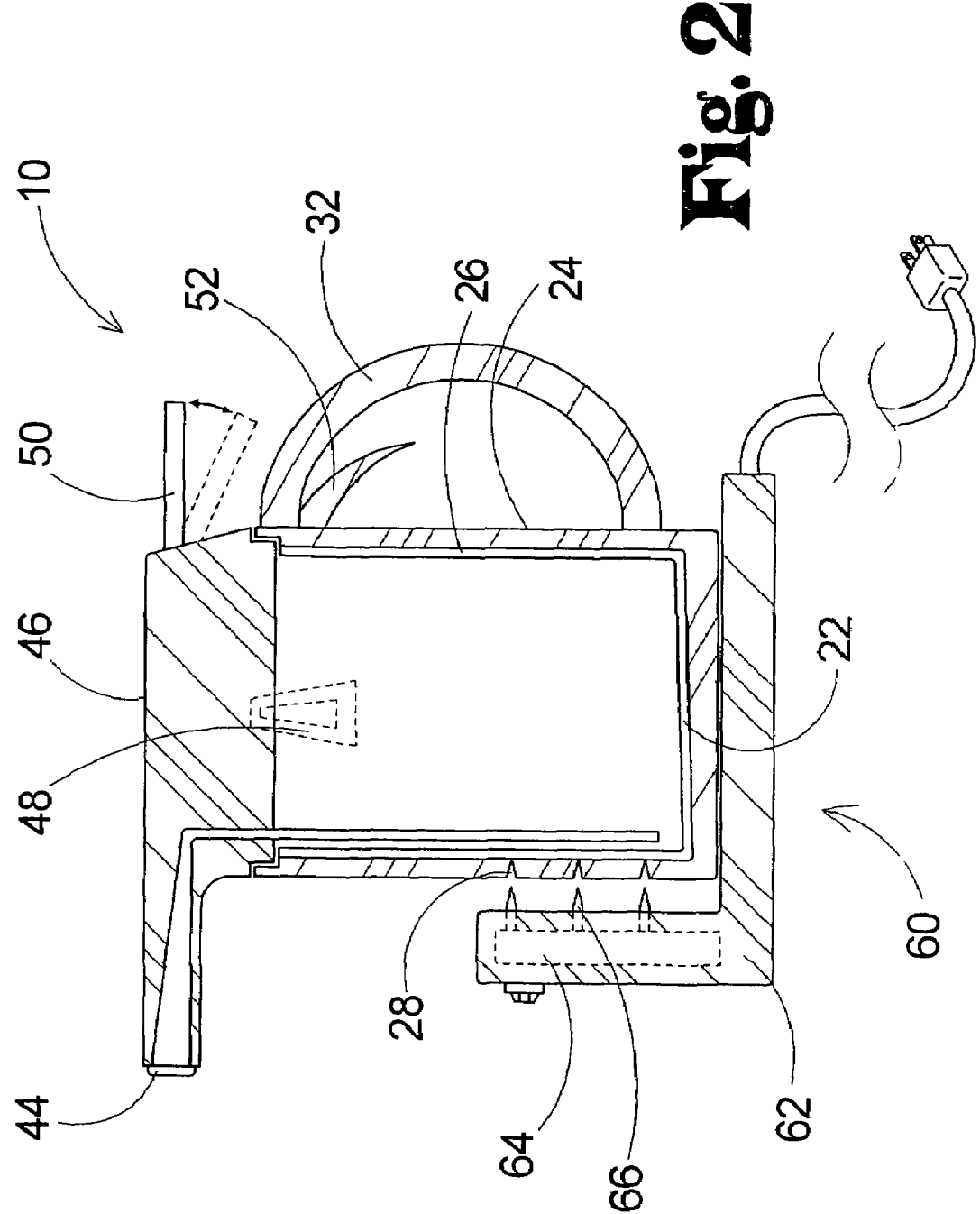
FIG. 2 is a schematic cross-sectional view of the present invention.

With reference now to the drawings, and in particular to FIGS. 1 and 2 thereof, a new butter heating and dispensing system embodying the principles and concepts of the present invention and generally designated by the reference numeral 10 will be described.

As best illustrated in FIGS. 1 and 2, the butter heating and dispensing system 10 generally comprises a container assembly 20, a spray assembly 40, and a heating assembly 60. The container assembly 20 includes an interior space for receiving a quantity of butter to be melted and dispensed.

The spray assembly 40 is operationally coupleable to the container assembly 20. The spray assembly 40 includes an intake 42 for liquid butter, and a spray nozzle 44 for dispersing the liquid butter. The heating assembly 60 is for providing thermal energy to melt the butter received by the container assembly 20. The heating assembly 60 is thermally coupleable with the container assembly 20.

Most preferably, the container assembly 20 has a sloped bottom wall 22, which slopes downwardly towards the intake 42 of the spray assembly 40.

In at least one embodiment, the heating assembly 60 further comprises a base portion 62, a heating element 64, and at least one thermal transfer contact 66. The base portion 62 is for selectively receiving the container assembly 20. The heating element 64 is positioned within the base portion 62, and provides thermal energy for melting the butter received in the container assembly 20. The thermal transfer contact 66 directs the thermal energy provided by the heating element 64 into an interior of the container assembly 20.

In a further embodiment, the container assembly 20 includes a thermally insulating outer wall 24 and a thermally conductive inner wall 26. The thermally insulating outer wall 24 includes at least one contact port 28, which facilitates thermal access to the thermally conductive inner wall 26. The base portion 62 includes at least one thermal transfer contact 66 for selectively transferring thermal energy to the thermally conductive inner wall 26 through the at least one contact port 28.

In still a further embodiment, the spray assembly 40 includes a lid portion 46 for selectively closing a top opening 30 of the container assembly 20. The lid portion 46 inhibits thermal transfer from the interior space to an external environment through the top opening 30.

In still yet a further embodiment, the lid portion 46 further comprises a securing member 48 for selectively securing the lid portion 46 to the container assembly 20. The securing member 48 may be a spring clip or other suitable device.

Preferably, the container assembly 20 includes a handle member 32, which is designed for being grasped by a human hand. The handle member 32 facilitates positioning of the container assembly 20.

The spray assembly 40 may include a pump member, with a lever 50 for actuating the spray assembly 40 such that butter flows from the intake 42 through the spray nozzle 44. The lever 50 may be positioned adjacent to the handle member 32 for facilitating one handed usage of the system.

In an embodiment, the lever 50 is positioned substantially above a top portion of the handle member 32 to facilitate actuation of the lever 50 with a thumb of the human hand grasping the handle member 32.

In a further embodiment, a second lever 52 is positioned substantially below a top portion of the handle member 32 to facilitate actuation of the second lever 52 with a finger of the human hand grasping the handle member 32.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A butter heating and dispensing system comprising:
   a container assembly having an interior space, said container assembly receiving a quantity of butter to be melted and dispensed,
   wherein said container assembly further comprises a handle member, said handle member being adapted for being grasped by a human hand, said handle member facilitating positioning of said container assembly,
   a spray assembly operationally coupleable to said container assembly, said spray assembly having an intake for liquid butter, said spray assembly having a spray nozzle for dispersing the liquid butter, the spray assembly having a pump member, said pump member having a lever for actuating said spray assembly such that butter flows from said intake through said spray nozzle, and further wherein said lever being positioned adjacent to said handle for facilitating one handed usage of said system,
   a heating assembly for providing thermal energy to melt the butter received by the container assembly, said heating assembly being thermally coupleable with said container assembly,
   a base portion for selectively receiving said container assembly,
   a heating element positioned within said base portion, said heating element providing thermal energy for melting the butter received in the container assembly, and
   at least one thermal transfer contact for directing the thermal energy provided by said heating element into an interior of said container assembly,
   wherein said container assembly has a thermally insulating outer wall and a thermally conductive inner wall, said thermally insulating outer wall having at least one contact port facilitating thermal access to said thermally conductive inner wall,
   further wherein said base portion having at least one thermal transfer member for selectively transferring thermal energy to said thermally conductive inner wall through said at least one contact port, and
   further wherein said lever is positioned substantially above a top portion of said handle to facilitate actuation of said lever with a thumb of the human hand grasping said handle, and further wherein a second lever being positioned substantially below a top portion of said handle to facilitate actuation of said second lever with a finger of the human hand grasping said handle.

2. The butter heating and dispensing system of claim 1 wherein said container assembly further comprises a sloped bottom wall, said bottom wall sloping downwardly towards said intake of said spray assembly.

3. The system of claim 1 wherein said spray assembly further comprises a lid portion for selectively closing a top opening of said container assembly, said lid portion inhibiting thermal transfer from said interior space to an external environment through said top opening.

4. The system of claim 3, wherein said lid portion further comprises a securing member for selectively securing said lid portion to said container assembly.

5. A butter heating and dispensing system comprising:
   a container assembly having an interior space, said container assembly receiving a quantity of butter to be melted and dispensed,
   a spray assembly operationally coupleable to said container assembly, said spray assembly having an intake for liquid butter, said spray assembly having a spray nozzle for dispersing the liquid butter,
   a heating assembly for providing thermal energy to melt the butter received by the container assembly, said heating assembly being thermally coupleable with said container assembly,
   wherein said container assembly further comprises a sloped bottom wall, said bottom wall sloping downwardly towards said intake of said spray assembly,
   wherein said heating assembly further comprises (i) a base portion for selectively receiving said container assembly, (ii) a heating element positioned within said base portion, said heating element providing thermal energy for melting the butter received in the container assembly, and (iii) at least one thermal transfer contact for directing the thermal energy provided by said heating element into an interior of said container assembly,
   wherein said container assembly has a thermally insulating outer wall and a thermally conductive inner wall, said thermally insulating outer wall having at least one contact port facilitating thermal access to said thermally conductive inner wall,
   wherein said base portion has at least one thermal transfer member for selectively transferring thermal energy to said thermally conductive inner wall through said at least one contact port,
   wherein said spray assembly further comprises a lid portion for selectively closing a top opening of said container assembly, lid portion inhibiting thermal transfer from said interior space to an external environment through said top opening,
   wherein said lid portion further comprises a securing member for selectively securing said lid portion to said container assembly,
   wherein said container assembly further comprises a handle member, said handle member being adapted for being grasped by a human hand, said handle member facilitating positioning of said container assembly,
   wherein said spray assembly further comprises a pump member, said pump member having a lever for actuating said spray assembly such that butter flows from said intake through said spray nozzle,
   wherein said lever is positioned adjacent to said handle for facilitating one handed usage of said system, said lever being positioned substantially above a top portion of said handle to facilitate actuation of said lever with a thumb of the human hand grasping said handle, and
   wherein a second lever is positioned substantially below a top portion of said handle to facilitate actuation of said second lever with a finger of the human hand grasping said handle.

6. A butter heating and dispensing system comprising:
   a container assembly having an interior space, said container assembly receiving a quantity of butter to be melted and dispensed,
   a spray assembly operationally coupleable to said container assembly, said spray assembly having an intake for liquid butter, said spray assembly having a spray nozzle for dispersing the liquid butter, and
   a heating assembly for providing thermal energy to melt the butter received by the container assembly, said heating assembly being thermally coupleable with said container assembly, wherein said container assembly further comprises a handle member, said handle member being adapted for being grasped by a human hand, said handle member facilitating positioning of said container assembly, wherein said spray assembly further comprises a pump member, said pump member having a lever for actuating said spray assembly such that butter flows from said intake through said spray nozzle, and further wherein said lever being positioned adjacent to said handle for facilitating one handed usage of said system, wherein said lever is positioned substantially above a top portion of said handle to facilitate actuation of said lever with a thumb of the human hand grasping said handle, and wherein a second lever being positioned substantially below a top portion of said handle to facilitate actuation of said second lever with a finger of the human hand grasping said handle.

7. The butter heating and dispensing system of claim 6 wherein said container assembly further comprises a sloped bottom wall, said bottom wall sloping downwardly towards said intake of said spray assembly.

8. The system of claim 6, wherein said heating assembly further comprises:

a base portion for selectively receiving said container assembly, a heating element positioned within said base portion, said heating element providing thermal energy for melting the butter received in the container assembly, and at least one thermal transfer contact for directing the thermal energy provided by said heating element into an interior of said container assembly.

9. The system of claim 8 wherein said container assembly has a thermally insulating outer wall and a thermally conductive inner wall, said thermally insulating outer wall having at least one contact port facilitating thermal access to said thermally conductive inner wall, and further wherein said base portion having at least one thermal transfer member for selectively transferring thermal energy to said thermally conductive inner wall through said at least one contact port.

10. The system of claim 6 wherein said spray assembly further comprises a lid portion for selectively closing a top opening of said container assembly, said lid portion inhibiting thermal transfer from said interior space to an external environment through said top opening.

* * * * *